July 26, 1966  G. FÖLL ETAL  3,262,344
CARRIAGE SPEED CONTROL APPARATUS
Filed Feb. 14, 1964  3 Sheets-Sheet 3

Inventors
Gerhard Föll
Karl Spohn
by Michael J. Striker
Att'y

United States Patent Office

3,262,344
Patented July 26, 1966

3,262,344
CARRIAGE SPEED CONTROL APPARATUS
Gerhard Föll and Karl Spohn, Esslingen (Neckar), Germany, assignors to Index-Werke K.G. Hahn & Tessky, Esslingen (Neckar), Germany
Filed Feb. 14, 1964, Ser. No. 345,032
Claims priority, application Germany, Feb. 20, 1963, J 23,204
21 Claims. (Cl. 82—21)

The present invention relates to a carriage speed control apparatus for an automatic machine tool, and more particularly to an automatic lathe which is provided with a plurality of preferably spaced carriages, each of which is controlled to perform a rapid movement toward the workpiece, and then a working stroke at a lower speed. When the working stroke is performed, the carriage is rapidly returned to its initial position.

In automatic lathes of this type according to the prior art, the carriage movement is controlled by rotary cams, and the drive shaft driving the cams is operated at a speed depending on the time required for an operation on the workpiece, for example, a drive shaft and cam thereon turn one revolution for each workpiece. When several tool carriages are provided in one machine, any interference between the movements of the several carriages to the working position must be avoided, and a satisfactory removal of the chips through the corresponding chute of the respective lathe must be assured. For this purpose, the several devices must be operated by the respective different cams in such a manner that certain carriages, which due to their positions would normally interfere with the operation of the respective other carriages, are retracted a sufficient distance from the working area of the machine. This requires such an arrangement of the respective cams that the several tool carriages approach each other as closely as possible in order to assure a direct succession of the operations effeced by the respective tool carriages.

The desired close sequence of carriage motions makes it necessary to hold the tool carriages for a certain time in their respective initial position which is accomplished by providing the cam from which the carriage is operated, wth a circular cam track portion. On the other hand, the cam must be designed so that the respective tool carriage performs a rapid stroke to approach the tool and then a working stroke to carry out the operation.

Due to the fact that the rotary speed of the respective cam depends on the time available for the operations on each workpiece, frequently a very long time for approaching the workpiece results although use is made of the maximum cam rise which is permissible in view of construction conditions. A corresponding time loss during the machining of a workpiece results when one or several carriages are used.

When the respective operation on the workpiece has been completed, the cam follower must move to the end of the rising cam track portion to drop back to the lower cam track portion. If the cam follower has a cam follower roller, this results in an angle determined by the radius of the cam follower roller during which the cam does not influence the cam follower. The time required for the cam to turn through this angle is also lost.

Due to the fact that the cams must have cam track portions to control the rapid approach movement of the carriage, the cams have great dimensions, and are not universally useable.

It is one object of the invention to overcome these disadvantages of carriage speed control apparatus according to the prior art, and to provide apparatus which moves a carriage in a rapid movement independently of the control of the carriage by a cam.

Another object of the invention is to provide a carriage control arrangement in which rapid strokes are carried out independently of the operations performed on the workpiece.

Another object of the invention is to provide a carriage control apparatus permitting a rapid carriage movement at any time of an operation performed under the control of a cam.

Another object of the invention is to provide a carriage control arrangement in which the carriage can be rapidly advanced and retracted at any selected speed independent of the rise of the cam controlling the carriage.

Another object of the present invention is to use first drive means, such as a cam, for controlling the carriage during the operation on the workpiece, and a second drive means for controlling the rapid advance of the carriage toward the workpiece, and its rapid retraction.

A related object of the invention is to control a carriage movement by a cam of small dimensions during operations performed on the workpiece, and to move the carriage rapidly by other drive means.

Another object of the invention is to control the start of the rapid movements of the carriage by control means operating in synchronism with the rotation of a cam which drives the carriage while an operation is performed on the workpiece.

With these objects in view, the present invention relates to a carriage speed control apparatus which is particularly advantageously applied to an automatic lathe in which several tool carriages are provided and operated in succession to perform different operations on a workpiece.

One embodiment of the invention comprises a support; a carriage mounted on the support; first drive means, preferably including a rotary cam and a cam follower; a motion-transmitting chain including first and second motion-transmitting means respectively connected to the cam follower and to the carriage, and second drive means preferably including hydraulic apparatus, for moving the second motion-transmitting means at such a speed that the carriage moves at a high speed.

The first and second motion-transmitting means are movable relative to each other, but have at least one operative connecting condition in which they connect the cam follower of the first drive means with the carriage so that the cam drives the carriage at a desired work speed through the connected first and second motion-transmitting means in the above mentioned operative connecting condition. The second drive means in an inoperative condition of the motion transmitting chain act on the second motion-transmitting means until the first and second motion-transmitting means are placed in the operative connecting condition.

Control means, preferably including a rotary actuator are driven from the rotary cam of the first drive means and operatively connected with the second drive means, for example by operating the valve which controls the hydraulic apparatus, so that the second drive means are actuated in timed relation with the position of the cam of the first drive means. Due to this arrangement the cam of the first drive means operates the carriage in the connecting condition of the first and second motion-transmitting means so that the carriage moves the tool in a working stroke acting on the workpiece, whereas the second drive means operates the carriage directly through the second connecting means and at a high speed as is desired for the rapid approach of the tool toward the workpiece, and for the rapid retraction of the tool after an operation has been performed.

Due to the fact that independent second drive means, controlled by an actuator, are provided, the carriage and tool can be operated at any desired moment, independently of the position of the cam of the first drive means.

In the arrangement of the present invention, the cam serves only the purpose of controlling the carriage during the actual operation on the workpiece, and as a result the cam can be small, and its rising portion can have a uniform gradient. The cam can have universal use, since no cam track portion specifically designed for the rapid motion of the carriage according to the prior are need be provided.

The second drive means by which the rapid movement of the carriage is accomplished, may be constructed as a mechanical, electrical, or combined apparatus, but hydraulic apparatus has been found particularly advantageous. The second drive means are advantageously mounted on the carriage.

In accordance with one embodiment of the invention, the piston of a hydraulic motor is fixedly secured to a carriage, and the cylinder is mounted for movement relative to the carriage and has a rack bar meshing with a pinion which turns a lever, forming part of the second connecting means, relative to a link which is connected to the cam follower and constitutes the first connecting means. When the lever controlled by the pinion is aligned with the link, a fixed connection is established through which the cam follower operates the carriage. However, while the lever arm and the pinion turn through 180° the carriage is rapidly advanced while the pressure fluid causes movement of the cylinder of the hydraulic motor.

According to another embodiment of the invention which is applied to the type of machine in which a tool carriage is operated by a lever having a segment gear and meshing with a rack bar on the carriage, the cam follower is connected to a casing with vane walls which constitutes the first motion-transmitting means and which is turnable relative to second motion-transmitting means including a shaft carrying a gear means for moving the carriage, and vanes cooperating with said vane walls to form expansible cavities or chambers so that pressure fluid causes movement of the gear means in a rapid motion which corresponds to the rapid advance or retraction of the carriage. At the end of the angular movement of the shaft, and gear, vane walls and vanes of the hydraulic apparatus abut each other and form a rigid connection so that the cam follower drives the carriage through the rigidly connected casing and shaft in a slower working stroke. The hydraulic apparatus in the casing preferably comprises an annular chamber into which radial vane walls secured to the hub project, while vanes secured to the shaft on which the lever is mounted project into sector shaped chambers formed between the walls.

In both embodiments, the hydraulic apparatus is actuated by a valve controlling the flow of pressure fluid from a pump, the valve being operated by a rotary actuator connected to the shaft of the cam for synchronous rotation. The actuator is preferably provided with actuating lugs whose position can be adjusted, so that the moment in which the second drive means starts to operate can be exactly determined in relation to the position of the cam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
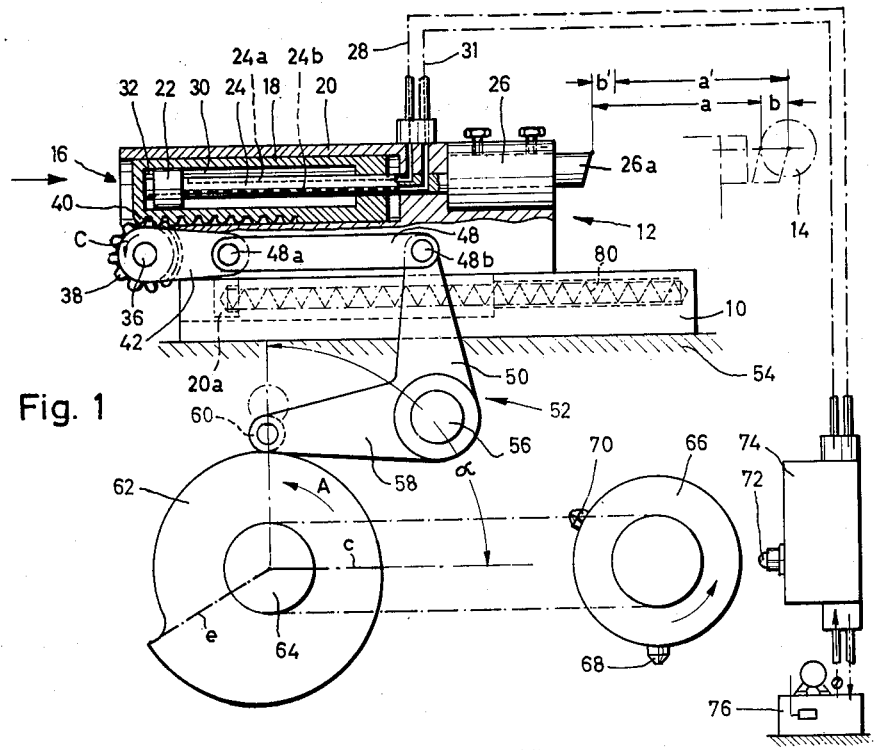
FIG. 1 is a fragmentary, partly schematic, elevation, partially shown in section and illustrating one embodiment of the invention in an initial position.
Figure 2:
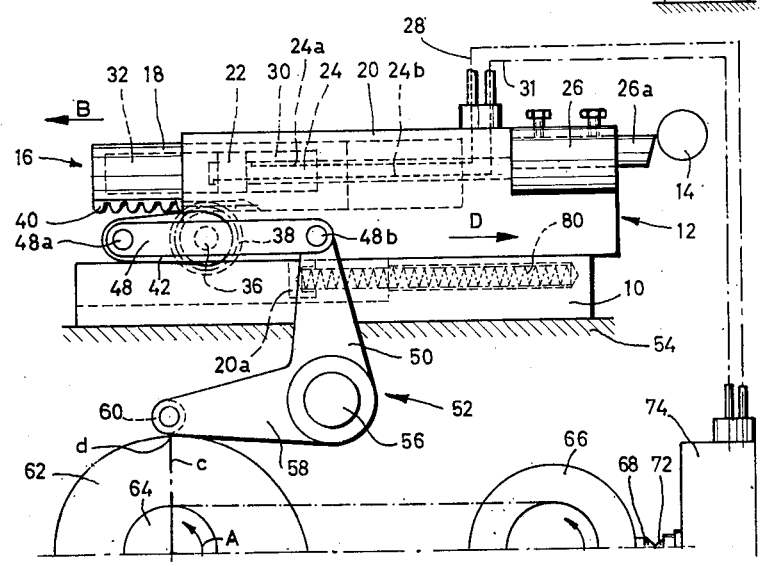
FIG. 2 is a fragmentary, partly schematic, elevation illustrating the embodiment of FIG. 1 in an operative position in which a tool has been rapidly advanced into the proximity of a workpiece.
Figure 3:
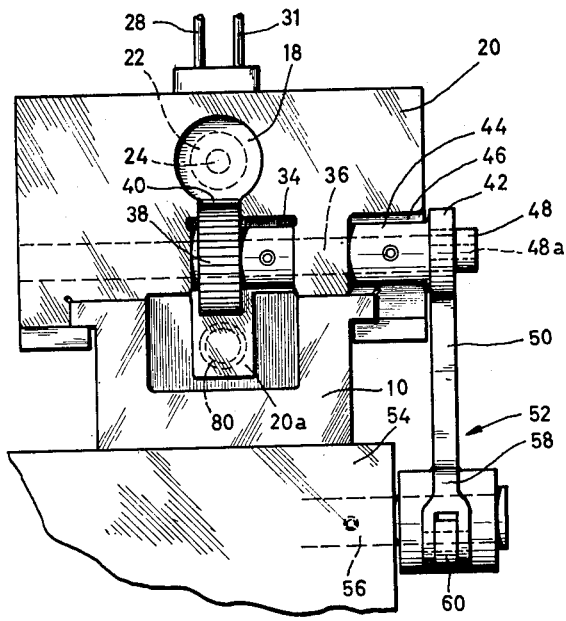
FIG. 3 is an end view taken in the direction of the arrow III in FIG. 1, and showing the apparatus on an enlarged scale.

Referring now to the drawings, and more particularly to FIGS. 1 to 3, a carriage generally indicated by the reference numeral 12 is mounted on a stationary support 10 for reciprocating movement in a forward direction to the right as viewed in FIG. 1 and in a return stroke in the opposite direction. A tool 26a is clamped by a tool holder 26 carried by the carriage casing 20. A cylinder 18 is mounted within a cavity of the carriage body for reciprocating movement to the right and left as viewed in FIG. 1. A piston 22 is located within cylinder 18 and connected by a piston rod 24 to the carriage body 20 on which tool 26a is mounted. Cylinder 18 and piston 22 constitute a hydraulic motor 16 by which rapid advance and return of tool 26a is effected.

A motor driven pump 76 is connected by pressure and suction conduits to a valve means 74 which is actuated by a depressible control member 72 operated by actuator lugs 68 and 70 on a rotary actuator disc 66. A pair of conduits 28 and 31 connect valve means 74 with ducts in the carriage body 20 which respectively communicate with a duct 24a in the piston rod opening in the chamber 30 of the cylinder, and a duct 24b opening in a chamber 32 on the left side of piston 22. When the valve 74 is operated to supply pressure fluid to chamber 32, cylinder 18 will move to the left as viewed in FIG. 1, whereas pressure fluid supplied from chamber 30 will cause the cylinder to move to the right. Since cylinder 18 is freely movable in the carriage body 20, and piston rod 24 is fixedly secured to the carriage body, pressure fluid supplied to chamber 32 will exert pressure to move cylinder 18 to the left as viewed in FIG. 1 out of the carriage body 20.

As best seen in FIG. 3, the carriage body 20 has a recess 34 in its bottom in the region of its rear end. A shaft 36 is mounted in carriage body 20, and carries a pinion 38 located in recess 34. Pinion 38 is secured to shaft 36, and meshes with a rack bar portion 40 provided on the outer surface of cylinder 18. On the front of carriage body 20, another cutout or recess 46 is provided, and the hub of a lever 42 is located in recess 46 and secured to shaft 36. A link 48 is articulated to the end of lever 42 by pivot pin 48a. The other end of link 48 is articulated to the arm 50 of a bell crank lever 52 by a pivot pin 48b. Bell crank lever 52 is mounted for angular movement on a shaft 56 mounted on the stationary base of the machine. The other arm 58 of bell crank lever 52 has a cam follower roller 60 which cooperates with the peripheral cam track of a rotary cam 62 which is driven by a drive shaft 64. The radius of the cam track increases between the radius $c$ and the radius $e$, while the remaining part of the cam track is circular and separated by steep shoulder from the rising cam track portion. Shaft 64 and cam 62 rotate in counterclockwise direction, as indicated by the arrow A. The position illustrated in FIG. 1 is the initial position of the cam in which cam follower roller 60 is spaced an angle of 90° from radius $c$ where the cam track rise begins.

Drive shaft 64 also carries an actuator 66 for synchronous rotation with rotary cam 62. In the schematic illustration of FIGS. 1 and 2, the rotary actuator 66 is shown for the sake of clarity in the same plane as cam 62, and this illustration would correspond to a construction in which pulley portions of cam 62 and actuator 66 are connected by a belt.

Actuator 66 includes a peripheral groove, not shown, in which actuator lugs 68 and 70 are adjustably mounted so that the circumferential positions of actuators or lugs 68 and 70 can be adjusted.

The apparatus illustrated in FIGS. 1, 2 and 3 is designed to move the tool 26a rapidly in a forward stroke a distance a, and then in a slower working stroke in the same direction a distance b. During the working stroke, a workpiece 14 is machined and turned. When the operation is completed, the tool is retracted rapidly in the opposite direction a distance a', and then slowly retracted a shorter return stroke through a distance b'.

The forward and return strokes through the distances b and b' are accomplished by first drive means including cam 62 and cam follower means 58, 60, and the forward and return strokes a, a' are accomplished at a higher speed by operation of the second drive means including cylinder 18 and piston 22.

The apparatus illustrated in FIGS. 1 to 3 operates as follows: Cam 62 is rotated at constant speed by shaft 64 to perform one revolution in the time in which the operation of tool 26a on workpiece 14 is finished.

The cam 62 is laid out in such a manner that the operation on the workpiece is to start after cam 62 has performed a turning movement through the angle α which is 90°, the corresponding cam track portion being circular.

Consequently, bell crank lever 52 will not be operated during this period and will not shift carriage 12. This condition is maintained until cam 62 has turned 90° and the starting point d of the rising cam track portion is located under cam follower roller 60, as shown in FIG. 2.

During the same period, actuator 66 also turns through 90 degrees and actuator lug 68 approaches the control member 72 of valve means 74. Since valve 72 is not actuated while the actuator 66 turns through 90°, carriage 12 and the tool 26a remain at a standstill.

This time period is used for carrying out other operations on workpiece 14 by similar apparatus of which a plurality is provided in the automatic lathe and whose cams are designed in such a manner that the carriage of only one apparatus is reciprocated to perform an operation on the workpiece, while the other carriages are stopped as described with reference to the illustrated apparatus.

Assuming that other carriages and tools were operated to perform operations on the workpiece before cam 62 arrives in the position of FIG. 2, and that the other carriages are now stopped by the respective cams thereof, the operation of the carriage of the illustrated apparatus may now start.

When actuator lug 68 engages control member 72 of valve 74, pressure fluid is supplied through line 28 and duct 24b into the working chamber 32 of cylinder 18 and the same is urged to move to the left as viewed in FIG. 1. An opposite pressure is exerted on piston 22, piston rod 24 and carriage body 20 so that the same is urged to move to the right as viewed in FIG. 1. While cylinder 18 moves partly out of carriage body 20, rack bar portion 40 meshes with pinion 38 and turns the same together with shaft 36 and lever arm 42 through an angle of 180° from the position shown in FIG. 1 to the position shown in FIG. 2. Since pivot pin 48a, link 48, and bell crank lever 50 cannot move since cam follower roller 60 abuts cam 62, shaft 36 causes carriage body 20 with tool 26a to advance a distance a in a rapid movement, so that tool 26a is placed directly adjacent workpiece 14, as shown in FIG. 2. This operation is so rapid that cam 62 has not turned to any substantial angle while the tool is advanced into the proximity of the workpiece.

Cam 62 continues its rotary motion in the direction of the arrow A out of the position shown in FIG. 2, so that the rising cam track portion becomes effective to turn bell crank lever 50 in clockwise direction. Since link 48, lever arm 42, pinion 38 and rack bar 40 with cylinder 18 form a rigid connection in the condition shown in FIG. 2, the turning movement of arm 50 of bell crank lever 52 causes movement of the carriage 12 with tool 26a through the distance b so that the workpiece 14 is machined.

Cam 62 and actuator 66 continue the turning movement until actuator lug 70 engages control member 72 of valve 74. This causes shifting of valve 74 so that pressure fluid is supplied through line 28 to working chamber 30 of cylinder 18 so that the pressure fluid in the cylinder urges piston 22 with carriage body 20 to the left, and cylinder 18 to the right as viewed in FIG. 2. Pinion 38 is turned in clockwise direction by rack bar portion 40 so that lever arm 42 performs an angular movement through 180° to the position shown in FIG. 1 whereby carriage body 20 is moved to the left a distance a'.

When cam follower roller 60 passes over the shoulder of the cam track of cam 62 in the region of radius e, a spring 80 mounted in a cavity of the support 10 and acting on a projection 20a of the carriage body 20, moves carriage 12 a distance b' to its initial position shown in FIG. 1.

In the embodiment illustrated in FIGS. 1 to 3, the actuator lugs 68 and 70 are set on the actuator 66 in such a position that only after the entire working stroke b is performed, and when cam follower 60 has arrived at the cam track shoulder, actuator lug 70 becomes effective to rapidly return the carriage with the tool. However, it would be possible to select a different position of actuator lug 70 so that the tool is rapidly withdrawn before being moved the entire distance b.

From the above description of one embodiment of the invention, it will become apparent that first drive means 64, 62, 60, 52 are connected to first motion-transmitting means 48 by pivot 48b, and that the second drive means 76, 74, 28, 31, 18, 22 and 24 are connected to second motion-transmitting means 40, 38, 36, 42. The first and second motion-transmitting means are connected by pivot pin 48a. The first and second motion-transmitting means have an inoperative condition in which they are movable relative to each other, so that the second drive means, particularly hydraulic means 18, 22 can move the carriage and tool through the second motion-transmitting means including pinion 38 and lever arm 42 until the second motion-transmitting means are placed in an operative connecting condition, such as shown in FIGS. 1 and 2, in which the first motion-transmitting means 48 and the second motion-transmitting means 64, 60, 62, 52 including lever arm 42 rigidly connect the first drive means with the carriage means due to the fact that lever arm 42 is aligned with link 48.

Control means including actuator 66 with actuator lugs 70 are driven from the first drive means 64 in synchronism with the same, and include control member 72 and valve means 74. The control means cause actuation of the second drive means including piston 22 and cylinder 18 so that the carriage is moved by the second connecting means, including pinion 38 and lever arm 42, until the connecting condition of the first and second connecting means, shown in FIGS. 1 and 2, is reached in which the first drive means 64, 62, 60, 52 are rigidly connected by the first and second connecting means to the carriage to operate the same.

Figure 6:
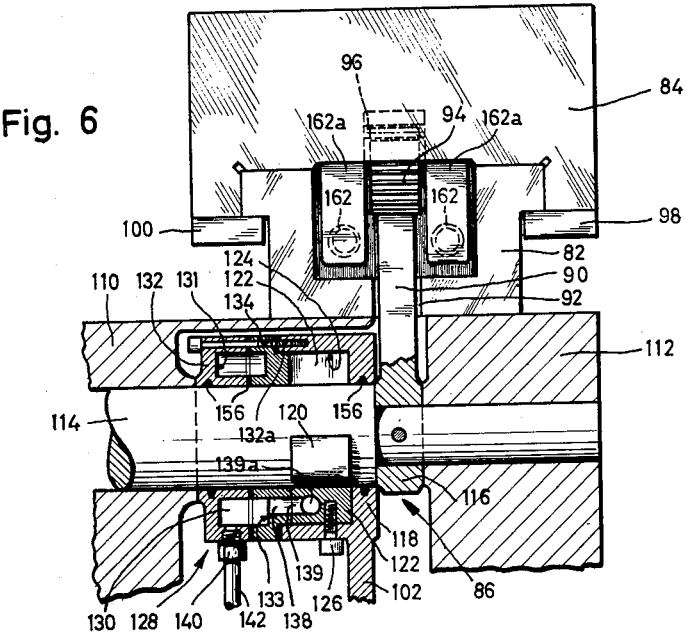
FIG. 6 is an end view, partially shown in section taken on line 6—6 in FIG. 5 and illustrating the embodiment of FIGS. 4 and 5 on an enlarged scale.
Figure 4:
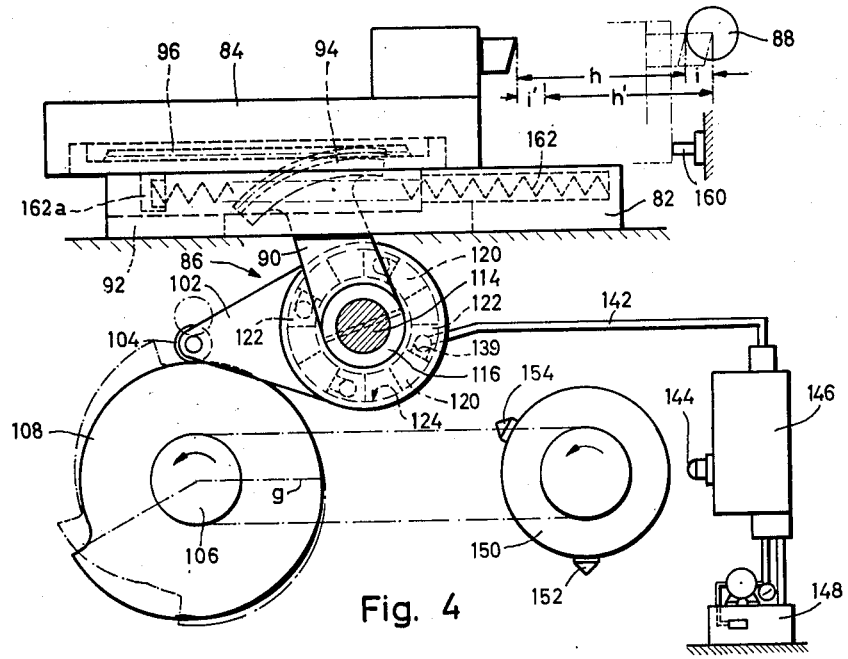
FIG. 4 is a fragmentary schematic elevation illustrating another embodiment of the invention in an initial position.
Figure 5:
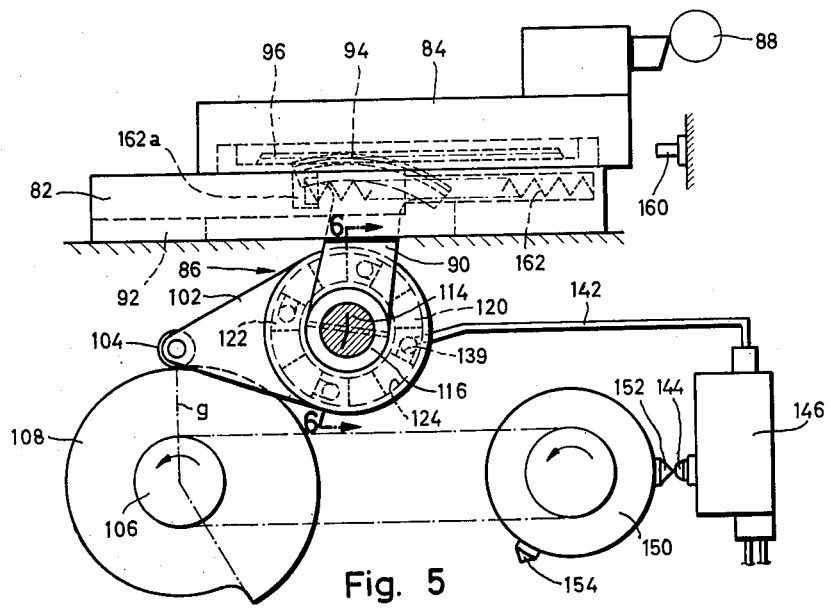
FIG. 5 is a fragmentary schematic view illustrating the embodiment of FIG. 4 in an operative position in which a tool has been rapidly advanced into the proximity of the workpiece.

Referring now to the embodiment illustrated in FIGS. 4, 5 and 6, a carriage 84 is mounted for reciprocating movement on a support means 82. A lever 86 has a gear segment 94 at one end which meshes with a rack bar 96 provided within a recess 92 of carriage 84. Carriage 84 has lateral guide members 98 and 100 engaging corresponding guide projections on support 82, as best seen in FIG. 6. Lever arm 90 is fixedly secured by a hub 116 and a pin to a thinner portion of a shaft 114 which is mounted in a bearing of a base portion 112. A cam follower lever 102 is mounted on the thicker portion of shaft 114 and has at its end a cam follower roller 104 cooperating with the track of the rotary cam 108 fixed to a drive shaft 106. An actuator 150 is carried by shaft 106 or otherwise connected thereto for synchronous rotation and has two actuator lugs 152 and 154 whose circumferential position on actuator 150 can be set and adjusted. Actuator lugs 152 and 154 cooperate with the control member 144 of a valve means 146 which controls the flow of pressure fluid produced by the pump means 148 and being discharged from valve means 146 through conduit means 142.

Lever 102 has a casing portion 118 mounted for free turning movement on the thicker shaft portion 114 which is turnable in bearing means of base portion 110. One side of casing portion 118 is located directly adjacent hub portion 116 of lever 90, and the other side of casing portion 118 is formed with a laterally open cavity of annular shape having an outer circumferential surface 124. The cavity is closed by an annular element generally indicated by reference numeral 128 which is composed of two parts 132 and 134 between which sealing means 156 are provided. Other sealing means 156 seal member 132 and casing portion 118 against shaft portion 114. Annular members 132 and 134 are secured to casing portion 118 by long threaded bolts 132a so that a stepped portion of member 134 closes the annular cavity in casing portion 118. Members 132 and 134 are each provided with an annular cavity 131 and 133, respectively, which together form an annular chamber 130. Annular member 134 has ducts 138 extending into ducts 139 of a plurality of radial walls located circumferentially spaced from each other in the annular cavity of casing portion 118, and being secured to casing portion 118 by screws 126. Each wall 122 has a duct 139a connected to the respective duct 139 and opening on one radial lateral face of the respective wall 122. Sector-shaped chambers are formed between the radial walls 122, as best seen in FIGS. 1 and 2, and a plurality of vanes 120 which are fixedly secured to shaft portion 114 and located, respectively, in the sector-shaped chambers in casing portion 118. The sector-shaped chambers are about twice as long in circumferential direction than the thickness of vanes 120. The vanes 120 are movable between a position abutting the face of the respective wall 120 which has the port of duct 139a, as shown in FIG. 4, and a position abutting the respective other face of the next following wall 122 as shown in FIG. 5. When pressure fluid is admitted into the cavity 130, it will flow through ducts 138, 139 and 139a in walls 122 into the sector-shaped chambers between walls 122, and more particularly between each wall 122 and the respective abutting vane 120, and move vanes 120 together with shaft 114 so that the same turns through a small angle until the vanes 120 abut the next following wall 122.

The annular part 132 has inlet means 140 communicating with the annular chamber 130 and connected to conduit 142 which leads to valve means 146.

The apparatus illustrated in FIGS. 4, 5 and 6 operates as follows:

In the initial position shown in FIG. 4, cam follower roller 104 rests on a circular cam track portion of cam 108 so that turning of shaft 106 to the position shown in FIG. 5 in which the radial line g is located under roller 104, will not effect any movement of lever 102. During this time period corresponding devices may be operated to cause other carriages, not shown, to move toward a workpiece 88 so that tools perform operations on the workpiece. When in the sequence of operations, the illustrated apparatus is to be actuated, cam 108 arrives in the position shown in FIG. 5. In this position, actuator 150 has turned the same angle as cam 108 to a position in which cam lug 152 engages control member 144 of valve 146, opening the same so that pressure fluid flows through conduit 142 into the annular chamber 133, and from there through ducts 138, 139, 139a into the sector-shaped expansible cavities or chambers between first partitioning walls 122 and the respective vanes 120 which are located adjacent the respective first partitioning walls 122 in the position shown in FIG. 4 due to the shape of cam 108. The pressure of the fluid causes movement of vanes 120 so that shaft 114 turns a small angle until the vanes abut the respective next following, second partitioning walls 122 in the position shown in FIG. 5.

Since lever 90 is fixedly connected with shaft 114, gear segment 94 engaging rack bar portion 96 causes rapid movement of carriage body 84 with the tool toward the workpiece 88 so that the tool is advanced a distance $h$. Lever 102 does not turn with shaft 114 since the fluid pressure acting on partitioning walls 122 urges lever 102' into a position in which cam follower roller abuts the track of cam 108.

Cam 108 continues its rotation so that the rising cam track portion following radial line $g$ becomes effective to turn lever 102 in clockwise direction. Closed chambers between the displaced vanes and the partitioning walls 122 are filled with a non-compressible liquid pressure fluid, the angular spacing between levers 90 and 102 cannot be reduced and the two levers are rigidly connected for turning movement so that carriage body 84 is advanced by gear segment 94 at a speed depending on the variation of the radial distance of the cam track from the axis of cam 108 and drive shaft 106. The tool is moved at a lower speed the distance $i$ and during such movement, the workpiece 88 is machined by the tool. The end of this short working stroke may be determined by an adjustable stop 160 which engages a leading face of the carriage body 84 in the desired terminal position of the carriage. In the event that stop 160 is used, the pressure in the working chambers of hub 118 is increased when the carriage abuts the stop and a suitable venting valve, not shown, is advantageously provided to relieve excess pressure. However, the end of the working stroke can also be determined by suitably setting actuator lug 154 so that the same engages control member 144 while cam follower roller is still located on the rising track portion of cam 108, in which event the pressure in the working chambers of hub portion 118 will be relieved so that a pair of springs 162 located within support 82 and acting on a pair of downwardly depending projections 162a of the carriage, move the carriage in return direction the distance $h'$. When cam 108 has turned further so that roller 104 drops over the steep shoulder of the cam track, the springs 162 return the carriage 84 a distance $i'$.

As indicated in chain lines in FIG. 4, the cam track may be shaped to have several rising portions and steep shoulders, which permits movement of carriage 84 under the control of cam 108 in several steps performed at different working speeds.

The length of the working stroke of the carriage cannot only be adjusted by stop 160, and by actuator lug 154, but also by adjusting the position of rack bar 96 relative to carriage 84 which varies the starting position of the carriage.

From the above description of the embodiment of FIGS. 4, 5 and 6, it will become apparent that drive shaft 106, cam 108, cam follower lever 102, 104 constitute first drive means, and that the hydraulic means 148, 142 constitute second drive means for moving the carriage at a high speed. Walls 122 and casing 118 constitute first motion-transmitting means, and vanes 120, shaft 114, lever 90, gear segment 94 and rack bar 96 constitute second motion-transmitting means. When the vanes with shaft 114 have been turned to the position of FIG. 5, the first and second motion-transmitting means are coupled and connected by the noncompressible fluid in an operative condition of the motion-transmitting means so that the first drive means including cam 108 can move the carriage through the thus connected first and second motion-transmitting means. However, while pressure fluid flows into the working chambers of hub portion 118, the motion-transmitting means are not rigidly connected and are in an inoperative condition, and the pressure fluid of the second drive means turns the second motion-transmitting means including shaft 114 and lever 90 so that the carriage is rapidly advanced.

It will be understood that each of the elements described above, or two or more together, may also find a useful application in other types of carriage arrangements for machine tools differing from the types described above.

While the invention has been illustrated and described as embodied in a carriage operable at two different speeds under the control of two independent drive means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essenial characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, support means, carriage means movably mounted on said support for fast movement between a retracted inoperative position and an intermediate position and for slow movement between said intermediate position and an advanced operative position; first drive means; a motion-transmitting chain connected at its input end to said first drive means and having at its output end a common motion-transmitting member associated with said carriage means for moving the same between said inoperative retracted, said intermediate and said operative advanced positions, and including first and second subsequent motion-transmitting means located between said input end and said common motion-transmitting means of said motion-transmitting chain, said first and second subsequent motion-transmitting means having an inoperative condition in which said motion-transmitting chain can not transmit motion impulses from said first drive means to said carriage means for movement of the same between said intermediate and operative advanced positions thereof and having an operative condition immovable relative to each other in which said motion-transmitting chain is adapted to transmit motion impulses to said carriage means for movement thereof between said intermediate and advanced operative positions thereof; and second drive means for directly transmitting motion impulses to said second motion-transmitting means and thereby to said carriage means when said first and second motion-transmitting means are in said inoperative condition thereof and for placing said first and second motion-transmitting means into said operative condition thereof so as to enable transmission of motion impulses from said first drive means to said carriage means.

2. A machine tool according to claim 1 wherein said second drive means is a hydraulic drive means.

3. A machine tool according to claim 1 and including control means operatively connected with said second drive means for actuating the same in timed relation with the operation of said first drive means so that said first drive means operates said carriage means in said operative condition, and said second drive means operates said carriage means through said second motion transmitting means.

4. A machine tool according to claim 1 wherein said first drive means include rotary cam means, and cam follower means operated by said rotary cam means and connected to said input of said motion transmitting chain; and wherein said second drive means include a hydraulic motor.

5. A machine tool according to claim 1 wherein said first drive means include rotary cam means, and cam follower means operated by said rotary cam means and connected to said input of said motion-transmitting chain; wherein said second drive means includes a hydraulic motor; and comprising a rotary actuator rotating in synchronism with said cam means, and a valve means controlled by said actuator for actuating said hydraulic motor in timed relation with the operation of said first drive means so that said first drive means operates said carriage means between said intermediate position and said advanced operative position, and said second drive means operates said carriage means between said retracted inoperative position and said intermediate position.

6. A machine tool according to claim 1 wherein said first drive means is a mechanical means; wherein said second drive means is a hydraulic drive means; and comprising control means driven from said mechanical drive means in synchronism with the same and operatively connected with said hydraulic drive means for actuating the same so that said mechanical and hydraulic drive means move said carriage means in a predetermined sequence.

7. A machine tool according to claim 6 wherein said hydraulic drive means includes a cylinder movably mounted on said carriage means and a piston secured to said carriage means; and comprising valve means controlling the flow of a fluid to and from said cylinder means; and wherein said control means include a rotary actuator driven from said first mechanical drive means and operating said valve means.

8. A machine tool according to claim 1 wherein said first motion-transmitting means include a first link, wherein said second motion-transmitting means include a lever mounted for turning movement on said carriage means and pivotally connected with said first link, said first and second links being aligned in said operative condition of said first and second motion transmitting means, and turning relative to each other in said inoperative condition while said second drive means transmit motion impulses to said second motion-transmitting means until said links assume the aligned position in which said first and second motion-transmitting means are in said operative condition so that motion impulses are transmitted from said first drive means to said carriage means.

9. A machine tool according to claim 8 wherein said second drive means includes a cylinder and a piston, said cylinder being movably mounted on said carriage means and having a rack portion, and said piston being secured to said carriage means; wherein said common motion transmitting member is a pinion mounted on said carriage means for rotation and meshing with said rack portion; and wherein said second link is a lever secured to said pinion for rotation therewith.

10. A machine tool according to claim 1 wherein said first drive means includes a rotary drive cam and a cam follower operated by said drive cam; wherein said second drive means includes a reciprocating member, wherein said first motion-transmitting means includes a link connected with said cam follower, and said second motion-transmitting means include a lever mounted on said carriage means and turned by said reciprocating member, said link and said lever being pivotally connected so that said lever and link assume during turning of said lever an aligned condition in which a force applied by said cam follower on said link is transmitted by said lever to said carriage means so that said first and second motion-transmitting means are in said operative condition when said link and said lever are aligned.

11. A machine tool according to claim 10 wherein said link is connected with said cam follower means for turning movement about a first axis; wherein said lever is turnable about a second axis, and is connected with said link for turning movement about a third axis, said first, second and third axes being aligned along a straight line in said operative condition of said first and second motion-transmitting means; and comprising control means driven from said cam means in synchronism with the same and including means for actuating said second drive means so that said lever is turned by said reciprocating member of said second drive means while moving fast between said retracted inoperative position and said intermediate position, whereupon said cam follower means moves said carriage means through said aligned lever and link in said slow movement between said intermediate position and said advanced operative position.

12. A machine tool according to claim 1 wherein said first motion-transmitting means include an annular casing having inner circumferentially spaced walls and being connected with said first drive means so as to be rotated by the same; and wherein said second motion-transmitting means include a shaft operatively connected with said carriage means, and a plurality of vanes mounted on said shaft and respectively located between adjacent pairs of first and second walls of said walls; and wherein said second drive means are hydraulic drive means for supplying a liquid to the spaces between said vanes and said first walls so that said vanes move away from said first walls and toward said second walls while turning said shaft whereby said carriage means is moved in said fast movement between said retracted inoperative position and said intermediate position while said casing and said walls are blocked against turning movement by said first drive means whereby said motion-transmitting chain is in said inoperative condition until the liquid pressure between said first walls and said vanes abutting said second walls establishes a driving connection in which said motion-transmitting chain is in said operative condition and said first drive means turn said casing, said walls, said vanes, and said shaft whereby said carriage means is moved in said slow movement between said intermediate position and said advanced operative position.

13. A machine tool according to claim 12 wherein said first drive means include a rotary cam, and a cam follower lever secured to said casing for rotation with the same; and comprising control means driven from said rotary cam in synchronism with the same and including valve means for controlling the flow of the liquid from said hydraulic drive means into said casing in timed relation with the turning of said cam follower lever by said cam means.

14. A machine tool according to claim 12 wherein said second motion-transmitting means include a lever secured to said shaft for rotation therewith, a gear segment on said lever, and a rack on said carriage means meshing with said gear segment.

15. A machine tool according to claim 12 wherein said first drive means include a rotary cam, and a cam follower lever cooperating with said rotary cam, said cam follower lever being mounted for turning movement on said shaft and carrying said casing so that the same is turned with said walls about said shaft when said cam follower lever is operated by said cam means; wherein said second motion-transmitting means include in addition to said shaft and said vanes, a gear means secured to the shaft for rotation therewith, and a rack on said carriage means meshing with said gear means; and comprising control means including a rotary actuator driven from said rotary cam means, and valve means operated by said rotary actuator to control the flow of liquid from said hydraulic drive means into said casing in a timed relation with the movement of said cam follower lever by said rotary cam means.

16. A machine tool according to claim 1 wherein said first motion-transmitting means include a first turnable member, and said second motion-transmitting means include a second turnable member, said first and second turnable members together forming at least one expansible and contractable cavity connected with said hydraulic drive means so that expansion of said cavity by liquid supplied by said hydraulic drive means causes movement of said carriage means in said fast movement between said retracted inoperative position and said intermediate position while said first member is blocked against motion by said first drive means and said motion transmitting chain is in said inoperative condition; and comprising control means driven from said first drive means and controlling said hydraulic drive means to prevent discharge of the liquid from said cavity when the same is fully expanded and said first drive means turns said first member together with said second member in said operative condition of said motion-transmitting chain so that said carriage means is moved by said second member in said slow movement between said intermediate position and said advanced operative position.

17. A carriage control apparatus for an automatic machine tool comprising, in combination;
support means;
a carriage mounted on said support means for reciprocating movement toward and away from a workpiece;
a rotary drive cam, and a cam follower operated by said drive cam;
a hydraulic motor mounted on said carriage and including a recoprocable member;
a connecting link driven from said cam follower;
a connecting lever operable by said reciprocating member to turn during movement of the same, and being pivotally connected with said link, said connecting lever being turnable to at least one connecting position aligned with said link in which position movements of said cam follower are transmitted to said carriage to operate the same in working strokes;
and control means driven from said cam in synchronism with the same and including valve means for controlling the flow of pressure fluid to said hydraulic motor so that said reciprocable member is actuated to turn said connecting lever until the same arrives in said connecting positions while said carriage is operated in rapid forward and return strokes.

18. A carriage control apparatus for an automatic machine tool comprising, in combination,
support means;
a carriage mounted on said support means for reciprocating movement toward and away from a workpiece;
a rotary drive cam, and a cam follower operated by said drive cam;
a hydraulic motor mounted on said carriage and including a piston and piston rod secured to said carriage, and a cylinder mounted in said carriage for reciprocating movement, said cylinder having a rack bar portion;
a pinion mounted on said carriage and meshing with said rack bar portion;
a connecting lever secured to said pinion for turning movement therewith;
a connecting link pivotally connected to said cam follower and operated by the same, said connecting lever being pivotally connected with said link and turning with said pinion during movement of said cylinder to and from a connecting position aligned with said link in which position movements of said cam follower are transmitted to said carriage to operate the same in working strokes;
and control means driven from said cam in synchronism with the same and including valve means for controlling the flow of pressure fluid to said hydraulic motor so that said cylinder is actuated to turn said connecting lever until the same arrives in said connecting positions while said carriage is operated in rapid forward and return strokes.

19. A carriage control apparatus for an automatic machine tool comprising, in combination, support means;

a carriage mounted on said support means for reciprocating movement toward and away from a workpiece;

a rotary drive cam, and a cam follower operated by said drive cam;

a hydraulic motor mounted on said carriage and including a reciprocable member;

a connecting link driven from said cam follower;

a connecting lever operable by said reciprocating member to turn during movement of the same, and being pivotally connected with said link, said connecting lever being turnable to at least one connecting position aligned with said link in which position movements of said cam follower are transmitted to said carriage to operate the same in working strokes;

and control means including a rotary actuator driven from said cam in synchronism with the same and a valve means operated by said rotary actuator for controlling the flow of pressure fluid to said hydraulic motor so that said reciprocable member is actuated to turn said connecting lever until the same arrives in said connecting positions while said carriage is operated in rapid forward and return strokes.

20. A carriage control apparatus for an automatic machine tool comprising, in combination, support means;

a carriage mounted on said support means for reciprocating movement toward and away from a workpiece;

a rotary drive cam, and a cam follower operated by said drive cam;

a hydraulic motor mounted on said carriage and including a piston and piston rod secured to said carriage, and a cylinder mounted in said carriage for reciprocating movement, said cylinder having a rack bar portion;

a pinion mounted on said carriage and meshing with said rack bar portion; a connecting lever secured to said pinion for turning movement therewith;

a connecting link pivotally connected to said cam follower and operated by the same, said connecting lever being pivotally connected with said link and turning with said pinion during movement of said cylinder to and from a connecting position aligned with said link in which position movements of said cam follower are transmitted to said carriage to operate the same in working strokes;

and control means including a rotary actuator driven from said cam in synchronism with the same and a valve means operated by said rotary actuator for controlling the flow of pressure fluid to said hydraulic motor so that said cylinder is actuated to turn said connecting lever until the same arrives in said connecting positions while said carriage is operated in rapid forward and return strokes, said actuator having a plurality of actuator lugs for successively actuating said valve means, one of said lugs controlling said valve means to cause start of a forward stroke of said carriage, and another lug controlling said valve means to cause start of a return stroke of the carriage, at least one lug being adjustable so that the angular distance between said lugs is variable so that said rapid strokes start in selected cam positions.

21. An apparatus as set forth in claim 20 and including a spring abutting said carriage and said support for urging said carriage away from the workpiece, and for urging said cam follower means toward said cam whereby said carriage returns to an initial position when said cam follower means moves from a high cam portion to a low cam portion.

References Cited by the Examiner

UNITED STATES PATENTS

| 2,039,347 | 5/1936 | Rich | 29—44 |
| 2,116,376 | 5/1938 | Anderson. | |
| 3,024,520 | 3/1962 | Pulman | 29—44 |
| 3,116,537 | 1/1964 | Boner | 29—44 |

FOREIGN PATENTS 699,814  11/1953  Great Britain.

WILLIAM W. DYER, JR., *Primary Examiner.*

L. VLACHOS, *Assistant Examiner.*